United States Patent [19]

Kimura

[11] Patent Number: 4,783,904
[45] Date of Patent: Nov. 15, 1988

[54] AUTOMATIC ASSEMBLY APPARATUS

[75] Inventor: Akira Kimura, Tokyo, Japan

[73] Assignee: Sony Corporation, Tokyo, Japan

[21] Appl. No.: 123,270

[22] Filed: Nov. 20, 1987

[51] Int. Cl.$^4$ .................................................. B23P 21/00
[52] U.S. Cl. ...................................... 29/786; 29/33 P;
29/711; 29/783; 29/787; 29/799; 29/823;
198/465.2; 901/7; 901/15; 901/41
[58] Field of Search ............... 29/23 P, 709, 711, 771,
29/783, 786, 787, 799, 822, 823; 901/7, 15, 41;
198/465.2

[56] References Cited

U.S. PATENT DOCUMENTS

| | | | |
|---|---|---|---|
| 4,500,065 | 2/1985 | Hennekes et al. | 901/41 X |
| 4,557,655 | 12/1985 | Berg | 901/7 X |
| 4,703,558 | 11/1987 | Mäkinen | 29/784 |

Primary Examiner—Timothy V. Eley
Assistant Examiner—Frances Chin
Attorney, Agent, or Firm—Alvin Sinderbrand

[57] ABSTRACT

An automatic assembly apparatus has a first conveyor for transporting trays carrying parts to be assembled, a second conveyor for transporting pallets on which the parts are to be assembled and which extends parallel to the first conveyor, a stocking station positioned between the first and second conveyors and at which a plurality of the trays can be accommodated, a working station adjacent to the second conveyor, a pusher arm for moving trays from the first conveyor to the stocking station, and a root mounted between the first and second conveyors for carrying the trays from the stocking station to parts supplying stations adjacent the working station, and for assembling, on pallets transported to and from the working station by the second conveyor, parts removed by the robot from trays situated at the parts supplying stations, whereby a plurality of parts can be assembled by a single robot and it is possible to automatically and efficiently assemble the parts even in cases of relatively small scale production.

2 Claims, 3 Drawing Sheets

AUTOMATIC ASSEMBLY APPARATUS

BACKGROUND OF THE INVENTION

1. Field of the Invention

This invention relates generally to automatic assembly systems, and more particularly is directed to an automatic assembly system or apparatus in which trays carrying parts arrayed thereon are transported to locations near a working station and the parts are automatically assembled at the working station by a robot which carries out a plurality of assembling operations thereon.

2. Description of the Prior Art

It has been proposed to use robots for automatically assembling the mechanical decks of audio and video tape recorders. In the existing automatic assembly operations, a number of robots are positioned along a production line for sequentially performing the necessary assembly operations. Thus, it is known to assemble the mechanical decks of audio and video tape recorders in a substantially automatic or unattended fashion.

However, when a product formed of many parts, as are the mechanical decks of audio and video tape recorders, is assembled in such automatic fashion, a number of robots are required for each production line. By reason of the foregoing, each production line is expensive and, therefore, existing automatic assembling procedures can not be applied economically to products in relatively small scale production.

Although the number of robots required for each production line can be minimized by increasing the number of parts to be assembled by each robot, the existing parts feeding arrangements, such as, ball feeders, magazines and the like by which parts are fed one-by-one to the robot are limited in respect to the types of parts that can be handled that way. In other words, some of the various types of parts to be assembled by a robot can not be fed thereto one at a time from a magazine or the like. On the other hand, if the parts to be assembled are arrayed and transported on trays conveyed along the production line, the resulting parts supplying system can have multi-purpose characteristics, that is, it can be used for supplying substantially all of the various types of parts that may be assembled automatically by a robot. However, the so-called stocking station for accommodating a number of such trays is expensive and occupies a relatively large space. Thus, it is difficult to provide a number of such stocking stations for trays respectively carrying the various types of parts to be assembled within the work area or reach of a single robot. Furthermore, supplying the trays to the respective stocking station presents a problem and it is difficult and costly to achieve the necessary alignment of the parts on the trays at the respective stocking station.

OBJECTS AND SUMMARY OF THE INVENTION

Accordingly, it is an object of this invention to provide an improved automatic assembly apparatus that solves the above mentioned problems encountered in the prior art.

More specifically, it is an object of this invention to provide an automatic assembly apparatus in which a plurality of parts-assembling operations can be automatically carried out by a single robot.

It is another object of this invention, to provide an automatic assembly apparatus, as aforesaid, which can efficiently and economically perform the automatic assembly operations even when relatively small scale production is involved.

It is still another object of this invention to provide an automatic assembly apparatus, as aforesaid, which is capable of reducing the cost of each production line which is arrayed to automatically effect substantially all of the assembling operations required on a product by means of a single robot, or at most a limited number of robots, so as to make such production profitable even on a relatively small scale.

According to one aspect of the invention, an automatic assembly apparatus has a first conveyor for transporting trays having arrayed thereon the various parts to be assembled, a second conveyor for transporting pallets on which the parts are to be assembled and which extends parallel to the first conveyor, a stocking station positioned between the first and second conveyors and at which a plurality of the trays can be accommodated, means, for example, in the form of a pusher arm, for moving trays from the first conveyor to the stocking station, a working station adjacent to the second conveyor, parts supplying stations adjacent the working station, and a robot mounted between the first and second conveyors for carrying the trays from the stocking station to the respective parts supplying station, and for assembling, on pallets transported to and from the working station by the second conveyor, parts removed by the robot from the trays accurately situated at the parts supplying stations.

The above, and other objects, features and advantages of the present invention, will become apparent from the following detailed description of a preferred embodiment which is to be read in conjunction with the accompanying drawings wherein the same reference numerals are employed for identifying the corresponding elements and parts in the several views.

DESCRIPTION OF THE PREFERRED EMBODIMENT

Figure 1:
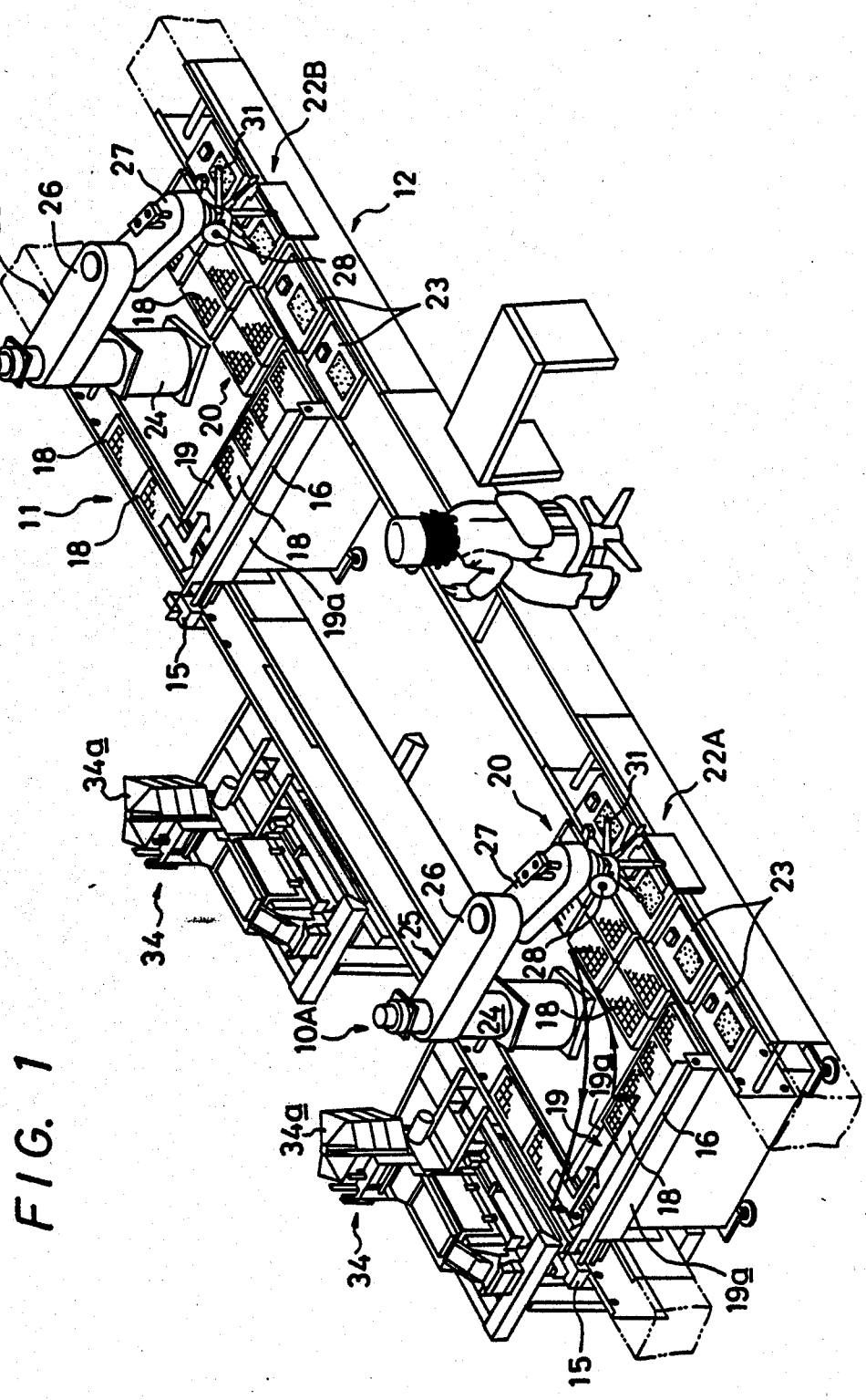
FIG. 1 is a perspective view of an automatic assembly system or apparatus according to an embodiment of the present invention.
Figure 2:
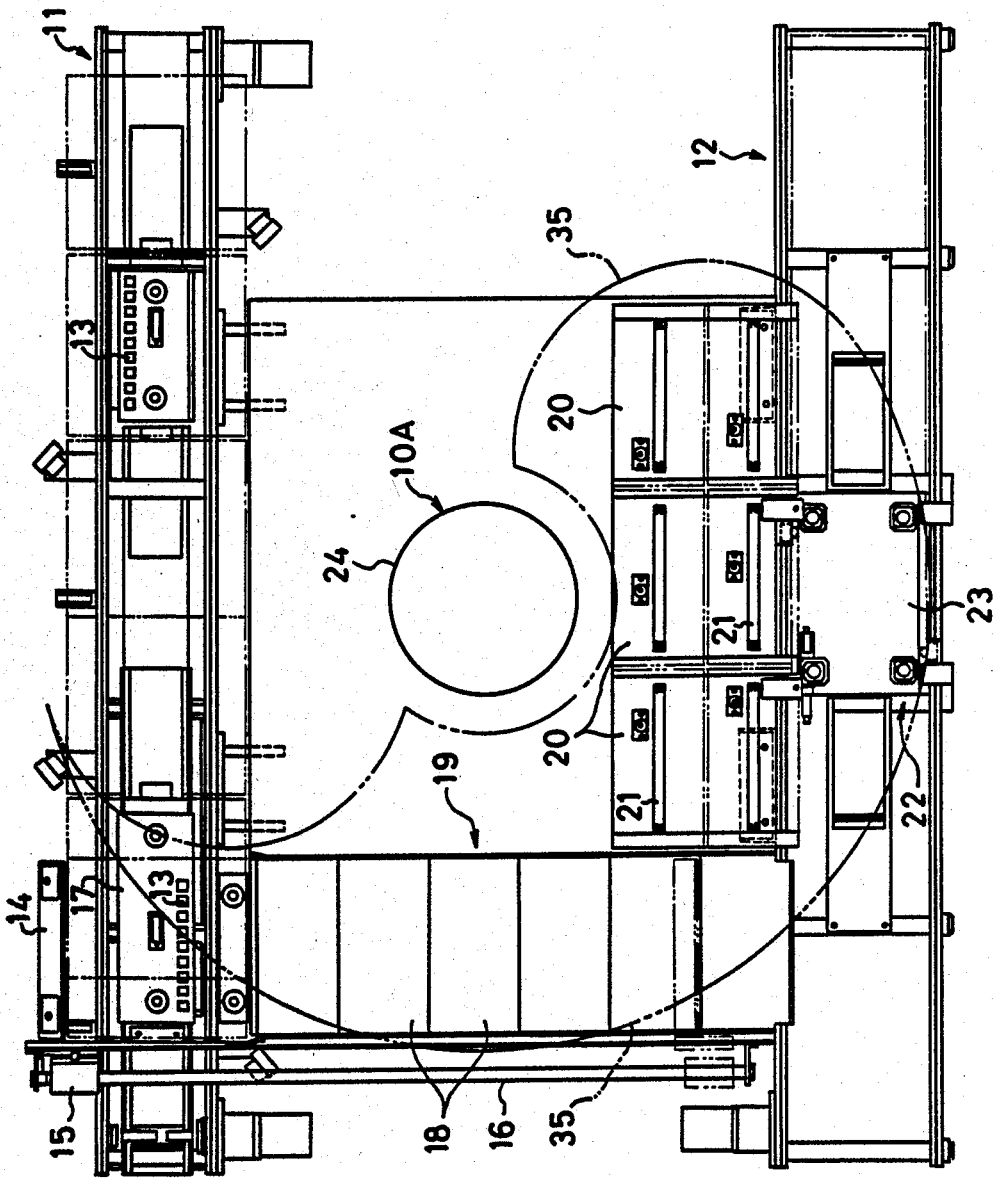
FIG. 2 is a top plan view of a portion of the automatic assembly apparatus shown on FIG. 1.

Referring initially to FIGS. 1 and 2, it will be seen that an automatic assembly system or apparatus according to the present invention generally comprises one or more assembly robots 10A and 10B positioned between first and second conveyors 11 and 12 which extend parallel to each other. The first conveyor 11 is provided for transporting trays 18 on which parts to be assembled are arrayed, and the second conveyor 12 is provided for transporting pallets 23 on which the parts are to be assembled by the robots 10A and 10B.

Tray detecting devices 13 (FIG. 2) are provided at predetermined positions under the first conveyor 11 for detecting the presence of trays 18 on such conveyor at the respective positions. A pusher arm 14 is provided at each of the positions along the first conveyor 11 having a tray detecting device 13 and from which the trays 18 arriving successively at such position are to be removed from the first conveyor 11 for transfer to a stocking station 19 associated with each of the robots 10A and 10B.

The stocking station 19 is seen to be defined by parallel guide rails 19a extending between conveyors 11 and 12 at a level substantially above that of the first conveyor 11. The guide rails 19a extending substantially at right angles to the paths along the conveyors 11 and 12 are spaced from each other so that trays 18, deposited one-at-a time on guide rails 19a at the ends thereof adjacent the first conveyor 11, can be slidably propelled in succession along guide rails 19a in the direction toward the second conveyor 12. The guide rails 19a are longitudinally dimensioned so that the stocking station 19 defined thereby can accommodate a sufficient number of trays, for example, six trays 18 in a row.

A lifter 17 (FIG. 2) is normally disposed below the level of the first conveyor 11 at the position opposite each stocking station 19 and is operable, when the associated tray detecting device 13 detects a tray 18 thereabove, to raise or elevate the detected tray 18 to the level of the guide rails 19a defining the stocking station 19. The pusher arm 14 is normally disposed at the side of the first conveyor 11 facing away from the second conveyor 12 at a level corresponding to that of the stocking station 19. The pusher arm 14 extends from a drive device 15 which is movable along a rod 16 extending parallel to the guide rails 19a of the stocking station. When the drive device 15 is operated, the pusher arm 14 is propelled from the position shown in full lines on FIG. 2 laterally across conveyor 11 so as to propel a tray 18 off the raised lifter 17 onto the guide rails 19a of the stocking station 19. As earlier noted, the stocking station 19 can accommodate six trays 18 which, with the respective parts arrayed thereon, are on standby at the stocking station.

The automatic assembly apparatus according to this invention is further shown to have six parts-supplying stations 20 provided at the side of the second conveyor 12 facing toward the first conveyor 11 near to a working station 22A or 22B defined on the second conveyor 12 at a position corresponding to the position of each robot 10A or 10B. Each of the parts-supplying stations 20 is shown to be provided with a tray positioning block or locating member 21 adapted to it into a correspondingly shaped recess in a tray 18 for precisely locating the latter at the respective parts supplying station 20.

Figure 3:
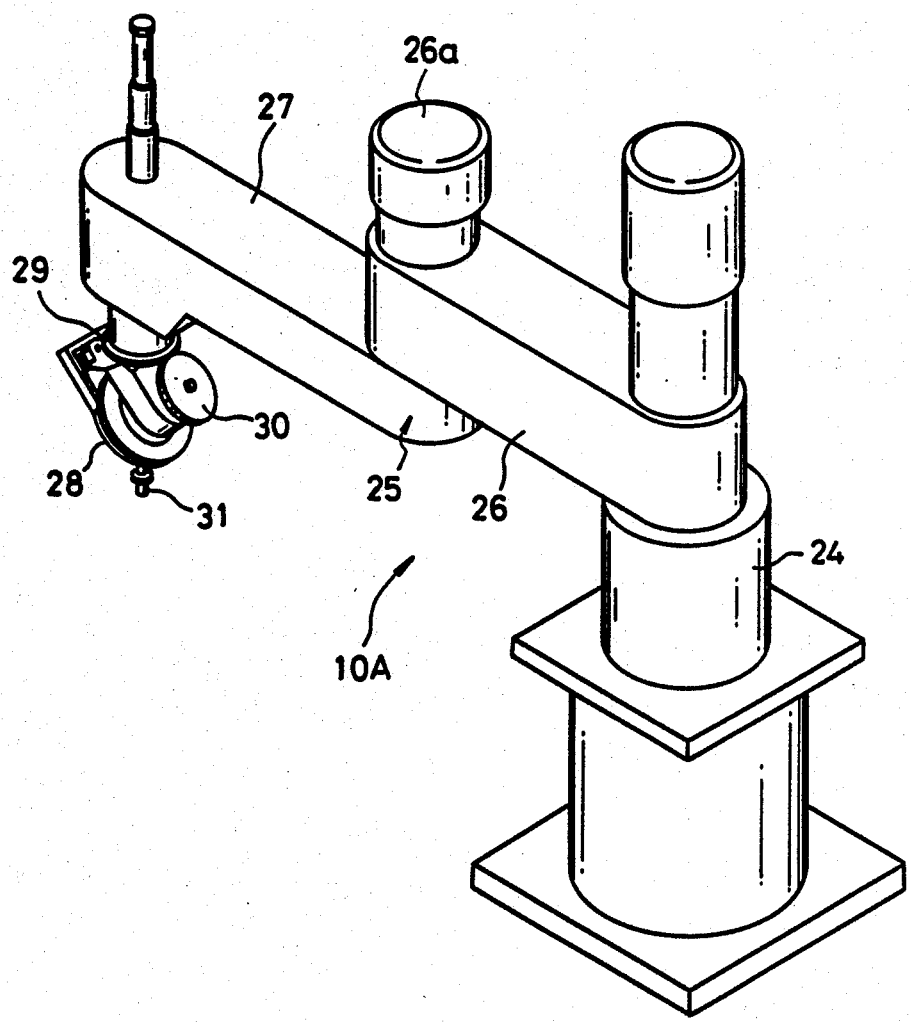
FIG. 3 is an enlarged perspective view of a robot included in the automatic assembly apparatus of FIGS. 1 and 2.

The second conveyor 12 is shown on FIG. 1 to be operative to transport a succession of the pallets 23 to and from the working stations 22A and 22B at which the various parts are assembled on each pallet 23 by means of the associated robots 10A and 10B. As shown particularly on FIG. 3, each of the assembly robots 10A and 10B includes a pedestal 24 fixedly mounted between the conveyors 11 and 12 approximately in line with the respective working station 22A or 22B. A horizontally extendible arm assembly 25 includes an inner rm 26 rotatably mounted, at one end, on the pedestal 24 for swinging about the vertical axis of the latter, and being pivotally connected at its opposite end, as at 26a, with an outer arm 27. A turret head 28 is suspended from the outer or free end of the arm 27 and is rotatable in respect to the latter by means of meshing gears 29 and 30 for selectively positioning or exchanging a number of chucking hands or tools 31 attached to the turret head 28. As shown on FIG. 2, by rotating the inner arm 26 about the vertical axis of pedestal 24, and by pivoting the outer arm 27 relative to the inner arm 26, the turret head 28 can be made to circumscribe a working area 35 outlined in dot-dash lines, and which substantially encompasses the six parts carrying trays 18 that may be accommodated at the stocking station 19, the six parts supplying stations 20, the respective working station 22A or 22B, and the first conveyor 11.

Further, as shown on FIG. 1, parts arranging devices 34 are provided at suitable locations adjacent the first conveyor 11. Each such parts arranging device 34 may be of the type disclosed in detail in U.S. patent application Ser. No. 07/050,553, filed May 18, 1987, and having a common assignee herewith. The parts arranging devices 34 form no part of the present invention, and, therefore, will not be described in detail herein. However, it may be noted that each parts arranging device 34 is operative to remove trays 18 from the adjacent first conveyor 11, to arrange on each tray 18 selected parts from a magazine 34a, and then to return the tray with the selected parts arranged or arrayed thereon to the first conveyor 11.

When the detecting device 13 adjacent the pusher arm 14 (FIG. 2) near to robot 10A, for example, detects the arrival at the respective position of a tray 18 with the selected parts thereon, the lifter 17 is operated so as to raise such tray 18 from the first conveyor 11 to the level of the stocking station 19. Then, the drive device 15 is operated so as to move along the rod 16 and thereby cause the pusher arm 14 to propel the tray 18 off the lifter 17 so as to be next in line at the stocking station 19. Since the trays 18 carrying various types of parts are all within the working area 35 of the robot 10 when the trays 18 are at the stocking station 19, any of the trays 18 at the stocking station can be removed therefrom by the robot 10A and transported by the latter to a respective one of the parts supplying stations 20. It will be appreciated that the robot 10A, which is suitably computer-controlled, memorizes, in advance, the types of parts on the several trays 18 at the stocking station 19. As the supply of parts at any one of the parts supplying stations 20 needs replenishment, the robot 10A, can select the tray 18 with the necessary parts thereon for transfer from the stocking station 19 to the respective parts supplying station 20. As earlier noted, the working area 35 of the robot 10 also extends over the first conveyor 11 and, when the parts carried by a tray 18 at a respective parts supplying station 20 have been exhausted, that is, when all of the parts on a tray have been incorporated in an assembly by the robot 10A, the latter is operative to return the empty tray 18 from the respective parts supplying station 20 to the first conveyor 11.

Simultaneously with the above described operations for bringing to the parts supplying stations 20 the trays 18 with the various types of parts to be assembled, the second conveyor 12 is operative to transport a pallet 23 to the working station 22A. With a pallet 23 situated at the working station 22A, the robot 10A is operative to remove the parts to be assembled from the respective trays 18 at the parts supplying stations 20, and then to assemble such parts by means of the various chucking hands 31 attached to the turret head 28. Since the chucking hands used are exchanged by rotation of the turret head 28, the single robot 10A can assemble as many as six different kinds of parts at the respective working station 22A by reason of the fact that there are six parts supplying stations 20 accommodating respective trays 18 carrying different types of parts. Upon completion of the assembly operations that can be performed by the robot 10A, the pallet 23 with the parts assembled thereon is transported by the second conveyor 12 to the working station 22B serviced by the next robot 10B. Of course, robot 10B is operative similarly to the robot 10A to further assemble with the partially assembled parts carried by the pallet 23 to the work station 22B, additional parts that have been carried by trays 18 transported to the stocking station 19 and then to the parts supplying stations 20 associated with the robot 10B in the manner previously described in respect to the robot 10A.

Although FIG. 1 shows two robots 10A and 10B associated with a single assembly line, it will be appreciated that, if the assembly to be produced incorporates six or less different kinds of parts, only a single robot would be sufficient. In any case, due to the possibility of assembling as many as six different kinds of parts by means of each robot, the number of the robots may be substantially reduced so as to correspondingly reduce the cost of the assembly line, and hence the cost of each product assembled thereby. Therefore, even when relatively small scale production of a product is anticipated, a robot or robots can be economically employed for automatically producing the same.

Of course, when assembling complex devices formed by the assembly of a large number of different parts, a single production or assembly line may be provided with, for example, 20 work stations at which a corresponding number of robots are situated. In such case, the arrangements at the several stations only differ from each other in respect to the chucking hands 31 provided on the turret 28 of each robot and the trays 18 carrying the various different kinds of parts. Thus, the order of the assembly operations and the product to be assembled can be fundamentally changed merely by replacing the trays and the parts carried thereby and by exchanging the chucking hands 31 of the several robots. Accordingly, the automatic assembly apparatus according to this invention is extremely flexible in its ready adaptation to the assembling of various different devices. Furthermore, the devices associated with each of the robots 10A and 10B, are relatively simple so that such devices are not susceptible to breakdowns and maintenance of the automatic assembly apparatus is facilitated.

The foregoing functional advantages are due, at least in part, to the fact that, in the automatic assembly apparatus according to this invention, each of the robots 10A and 10B is operative to transport the trays 18 carrying the various types of parts from the respective stocking station 19 to the respective parts supplying stations 20 near to the robot, whereupon, the same robot is operative to remove selected parts from the trays 18 at the parts supplying stations 20 and to assemble such parts on a pallet 23 at the associated working station 22A or 22B. At each parts supplying station 20, the respective tray 18 is accurately positioned by the locating member 21 so that the robot 10A or 10B can easily locate and pick-up the individual parts to be assembled.

Although a specific embodiment of the invention has been described in detail above with reference to the accompanying drawings, it is to be understood that the invention is not limited to that precise embodiment, and that various changes and modifications may be effected therein by one skilled in the art without departing from the scope or spirit of the invention as defined by the appended claims.

What is claimed is:

1. An automatic assembly apparatus comprising:
   first conveyor means for transporting trays carrying parts along a predetermined path;
   second conveyor means for transporting pallets on which said parts are to be assembled along a path extending parallel with said path of the first conveyor means;
   means defining a stocking section between said first and second conveyor means and at which a plurality of said trays can be accommodated in a row extending substantially at right angles from one side of said path of said first conveyor means towards said second conveyor means;
   means for moving said trays from said first conveyor means to said stocking station including a pusher arm reciprocable from an idle position at the other side of said path of the first conveyor means across the latter and along the direction of said row;
   means defining a working station adjacent to said second conveyor means;
   means for defining parts supplying stations adjacent said second conveyor means near to said working station;
   robot means mounted between said first and second conveyor means and being operative for carrying said trays from said stocking station to said parts supplying stations and for assembling, on said pallets transported to and from said working station by said second conveyor means, said parts from said trays situated at said parts supplying stations, said robot means including arm means supported, at one end, for rotary movements about a vertical axis between said first and second conveyor means and being horizontally extendible to have a reach, at its other end, encompassing said stocking station, working station and parts supplying stations, and tool means selectively positioned at said other end for operating on said trays and parts, respectively;
   parts supplying means disposed adjacent said first conveyor means for supplying parts to said trays transported by said first conveyor means; and
   means for detecting said trays on said first conveyor means and for causing actuation of said means for moving the trays from said first conveyor means to said stocking station.

2. An automatic assembly apparatus comprising:
   first conveyor means for transporting trays carrying parts along a predetermined path;
   second conveyor means for transporting pallets on which said parts are to be assembled along a path extending parallel with said path of the first conveyor means;
   means defining a stocking station between said first and second conveyor means and at which a plurality of said trays can be accommodated in a row extending substantially at right angles from one side of said path of said first conveyor means towards said second conveyor means;
   means defining a working station adjacent to said second conveyor means;
   means for moving said trays from said first conveyor means to said stocking station including a pusher arm reciprocable from an idle position at the other side of said path of the first conveyor means across the latter and along the direction of said row;
   means for defining parts supplying stations adjacent said second conveyor means near to said working station; and
   robot means mounted between said first and second conveyor means and being operative for carrying said trays from said stocking station to said parts supplying stations and for assembling, on said pallets transported to and from said working station by said second conveyor means, said parts from said trays situated at said parts supplying stations.

* * * * *